(12) United States Patent
Matsuoka

(10) Patent No.: US 10,408,950 B2
(45) Date of Patent: Sep. 10, 2019

(54) IMAGE ACQUISITION APPARATUS AND IMAGE ACQUISITION METHOD

(71) Applicant: HAMAMATSU PHOTONICS K.K., Hamamatsu-shi, Shizuoka (JP)

(72) Inventor: Kenta Matsuoka, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 112 days.

(21) Appl. No.: 15/431,868

(22) Filed: Feb. 14, 2017

(65) Prior Publication Data

US 2017/0242134 A1 Aug. 24, 2017

(30) Foreign Application Priority Data

Feb. 18, 2016 (JP) .................................. 2016-028903

(51) Int. Cl.
*G01T 1/20* (2006.01)
*G06K 9/40* (2006.01)
*G06T 5/00* (2006.01)
*H04N 5/32* (2006.01)
*H04N 5/365* (2011.01)

(52) U.S. Cl.
CPC ............. *G01T 1/2018* (2013.01); *G06K 9/40* (2013.01); *G06T 5/00* (2013.01); *G06T 5/008* (2013.01); *H04N 5/32* (2013.01); *H04N 5/3651* (2013.01)

(58) Field of Classification Search
CPC .................................. G01T 1/2018; G06K 9/40
See application file for complete search history.

(56) References Cited

U.S. PATENT DOCUMENTS

| 5,756,981 A | * | 5/1998 | Roustaei | ................. G03F 7/705 235/462.07 |
| 6,042,267 A | * | 3/2000 | Muraki | ................. G01T 1/2018 348/E5.086 |
| 2004/0051796 A1 | * | 3/2004 | Kelly | ..................... H04N 5/361 348/243 |
| 2011/0057802 A1 | * | 3/2011 | Topfer | ................... A61B 6/585 340/584 |

(Continued)

FOREIGN PATENT DOCUMENTS

| JP | H2-052579 A | 2/1990 |
| JP | H8-215182 A | 8/1996 |
| JP | H10-282243 A | 10/1998 |

(Continued)

*Primary Examiner* — Yara B Green
(74) *Attorney, Agent, or Firm* — Drinker Biddle & Reath LLP

(57) ABSTRACT

An image acquisition apparatus includes a fiber optic member including optical fibers, and transmitting an optical image from an input end face to an output end face, an imaging device including pixels, imaging the optical image from the output end face, and outputting an image, and an image processing device performing flat field correction of a fixed pattern noise for the image from the imaging device. The image processing device sets a first switching point of the correction on the basis of a noise peak point, performs the flat field correction in a case where output intensity from an object pixel of the image is lower than first switching intensity at the first switching point, and does not perform the correction in a case where the output intensity is higher than the first switching intensity.

14 Claims, 18 Drawing Sheets

(56) References Cited

U.S. PATENT DOCUMENTS

2012/0075505 A1* 3/2012 Van Beek ............ H04N 5/2173
                                                          348/241

FOREIGN PATENT DOCUMENTS

| JP | 2003-000576 A | 1/2003 |
| JP | 2003-021732 A | 1/2003 |
| JP | 2005-259176 A | 9/2005 |
| JP | 2014-131619 A | 7/2014 |

* cited by examiner

*Fig.4A*

| 100 | 108 |
|-----|-----|
| 108 | 92  |

FFC
LINEAR
REGION →

*Fig.4B*

| 100 | 100 |
|-----|-----|
| 100 | 100 |

*Fig.4C*

| 100 | 102 |
|-----|-----|
| 102 | 98  |

FFC
SATURATION
REGION →

*Fig.4D*

| 100 | 94  |
|-----|-----|
| 94  | 106 |

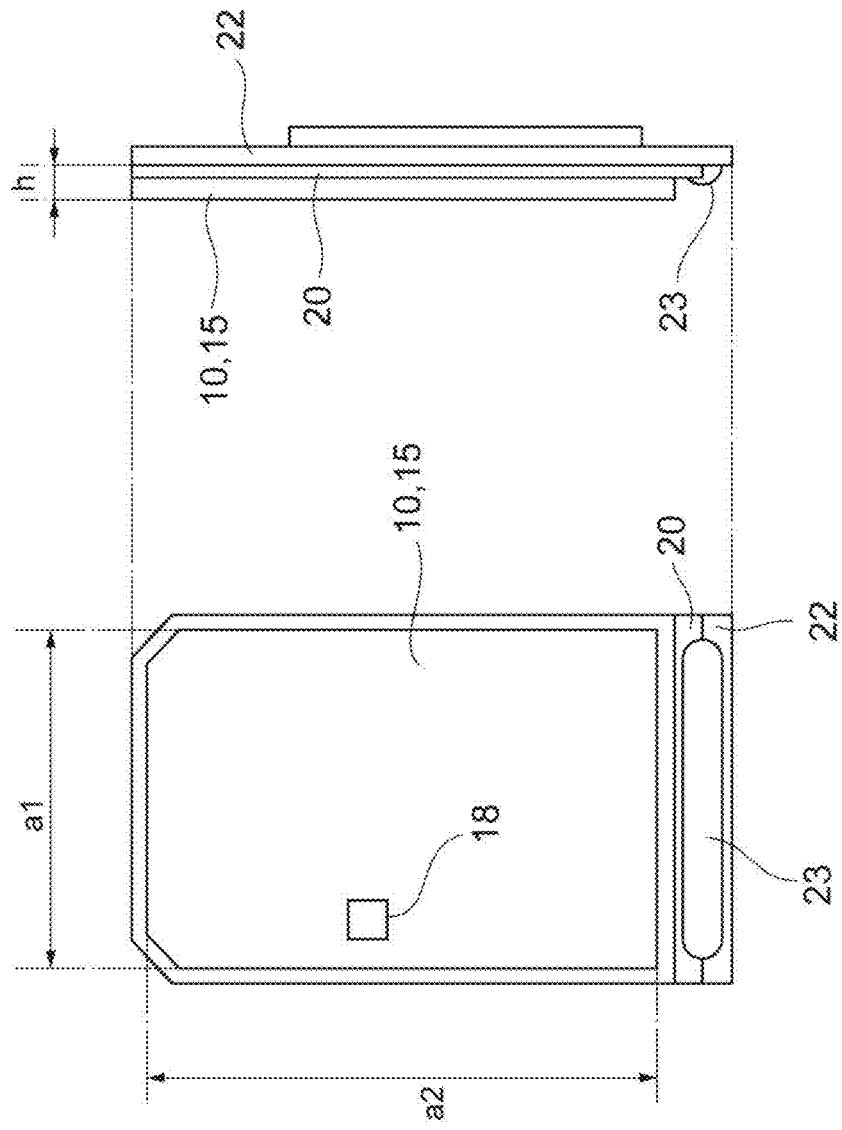

*Fig.18A*

| 100 | 104 |
|---|---|
| 104 | 96 |

→ FFC 8% →

*Fig.18B*

| 100 | 96 |
|---|---|
| 96 | 104 |

→ FFC 6% →

*Fig.18C*

| 100 | 98 |
|---|---|
| 98 | 102 |

→ FFC 4% →

*Fig.18D*

| 100 | 100 |
|---|---|
| 100 | 100 |

IMAGE ACQUISITION APPARATUS AND IMAGE ACQUISITION METHOD

BACKGROUND OF THE INVENTION

Field of the Invention

The present invention relates to an image acquisition apparatus including a fiber optic member and an imaging device, and an image acquisition method.

Related Background Art

In image acquisition by a solid-state imaging device including a plurality of pixels, a fixed pattern noise (FPN) caused by a sensitivity variation in each pixel due to a pixel structure, an imaging characteristic, and the like of the imaging device is generated in an acquired image. Such a fixed pattern noise becomes a cause of deterioration in an image acquired by the imaging device.

As a method of suppressing an influence of such a fixed pattern noise, a method called flat field correction (FFC) is proposed. The flat field correction is sensitivity correction for each pixel of an image acquired by an imaging device, and correction is performed in such a manner that an output from a pixel with low sensitivity becomes high and an output from a pixel with high sensitivity becomes low, whereby an image with sensitivity being uniform in the whole image is acquired (see, for example, Patent Document 1).

Patent Document 1: Japanese Patent Application Laid-Open Publication No. 2014-131619
Patent Document 2: Japanese Patent Application Laid-Open Publication No. H10-282243
Patent Document 3: Japanese Patent Application Laid-Open Publication No. 2003-21732
Patent Document 4: Japanese Patent Application Laid-Open Publication No. 2005-259176

SUMMARY OF THE INVENTION

As an image acquisition apparatus using the above-described solid-state imaging device, a configuration in which an imaging device and a fiber optic plate (FOP) are combined is known (see, for example, Patent Documents 2 to 4). In an image acquisition apparatus with such a configuration, a sensitivity variation due to a structure or the like of a fiber optic plate is generated in addition to a sensitivity variation due to an imaging device, and an influence of a fixed pattern noise in an acquired image is increased compared to a case where there is only an imaging device. Thus, in such an apparatus, flat field correction performed for an image is specifically important for acquiring an image with high quality.

Here, a fixed pattern noise in an image acquired by the imaging device is constant in a linear region in which intensity of an output signal varies in a linear manner with respect to input light intensity into a pixel, however, in a saturation region in which input light intensity becomes higher than a certain degree and an output signal is saturated, an influence of a fixed pattern noise becomes small along with an increase in output intensity. Thus, when flat field correction similar to that in the linear region is performed in such a saturation region, a reverse pattern of the fixed pattern noise is generated by the correction and image quality is inversely deteriorated.

The present invention has been made in order to solve the above problem, and an object thereof is to provide an image acquisition apparatus and an image acquisition method that can perform flat field correction suitably for image acquisition in a configuration in which an imaging device and a fiber optic member are combined.

In order to achieve the above object, an image acquisition apparatus according to the present invention includes (1) a fiber optic member including a plurality of optical fibers arrayed two-dimensionally, and transmitting an optical image, being input from an input end face constituted by one end faces of the plurality of optical fibers, to an output end face constituted by the other end faces of the plurality of optical fibers; (2) an imaging device including a plurality of pixels arrayed two-dimensionally, being optically coupled to the output end face of the fiber optic member, imaging the optical image output from the output end face, and outputting an acquired image; and (3) an image processing device performing flat field correction, for correcting a fixed pattern noise due to the fiber optic member and the imaging device, for the image output from the imaging device, and (4) the image processing device sets a first switching point of the flat field correction on the basis of a noise peak point in a variation in fixed pattern noise intensity with respect to a variation in output intensity in the pixel included in the image to be corrected, and (5) with respect to the flat field correction on each of the plurality of pixels in the image, performs the flat field correction by a predetermined correction pattern in a case where output intensity from an object pixel is lower than first switching intensity at the first switching point, and does not perform the flat field correction in a case where the output intensity from the object pixel is higher than the first switching intensity.

An image acquisition method according to the present invention uses an image acquisition apparatus including (a) a fiber optic member including a plurality of optical fibers arrayed two-dimensionally, and transmitting an optical image, being input from an input end face constituted by one end faces of the plurality of optical fibers, to an output end face constituted by the other end faces of the plurality of optical fibers, and (b) an imaging device including a plurality of pixels arrayed two-dimensionally, and being optically coupled to the output end face of the fiber optic member, and the method includes (c) an imaging step of imaging the optical image output from the output end face of the fiber optic member by the imaging device, and outputting an acquired image; and (d) an image processing step of performing flat field correction, for correcting a fixed pattern noise due to the fiber optic member and the imaging device, for the image output from the imaging device, and (e) in the image processing step, a first switching point of the flat field correction is set on the basis of a noise peak point in a variation in fixed pattern noise intensity with respect to a variation in output intensity in the pixel included in the image to be corrected, and (f) with respect to the flat field correction on each of the plurality of pixels in the image, the flat field correction is performed by a predetermined correction pattern in a case where output intensity from an object pixel is lower than first switching intensity at the first switching point, and the flat field correction is not performed in a case where the output intensity from the object pixel is higher than the first switching intensity.

In the above-described image acquisition apparatus and image acquisition method, a fiber optic member, such as a fiber optic plate, that includes a plurality of optical fibers and that transmits an optical image from an input end face to an output end face and an imaging device including a plurality of pixels are combined and flat field correction is performed for an image, which is acquired by the imaging device, in an image processing device. Accordingly, it is possible to suppress an influence of a fixed pattern noise in the image acquired by the imaging device which noise is due to a structure, a characteristic, or the like of the fiber optic member and the imaging device.

Moreover, in such a configuration, a first switching point to switch a correction condition of flat field correction is set with reference to a noise peak point in a variation in fixed pattern noise intensity with respect to a variation in output intensity (which point corresponds to peak point in graph with horizontal axis being output intensity and vertical axis being fixed pattern noise intensity), and the flat field correction is performed in a region in which output intensity is lower than that at the first switching point, and the correction is not performed in a region in which output intensity is higher than that at the first switching point. According to such a configuration, it becomes possible to suppress generation of a reverse pattern of a fixed pattern noise due to correction in a saturation region and to suitably perform flat field correction for an image as a whole.

According to an image acquisition apparatus and an image acquisition method of the present invention, a fiber optic member, an imaging device, and an image processing device to perform flat field correction for a fixed pattern noise are provided, a first switching point is set on the basis of a noise peak point of fixed pattern noise intensity for the flat field correction performed in the image processing device, the flat field correction is performed by a predetermined correction pattern in a case where output intensity from an object pixel in an image to be corrected is lower than first switching intensity at the first switching point, and the flat field correction is not performed in a case where the output intensity from the object pixel is higher than the first switching intensity, and thus, it becomes possible to suppress generation of a reverse pattern of the fixed pattern noise due to correction in a saturation region and to suitably perform the flat field correction for the image as a whole.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4A to FIG. 4D are views illustrating (A), (B) flat field correction for a fixed pattern noise in a linear region, and (C), (D) generation of a reverse pattern due to flat field correction in a saturation region.

FIG. 8A and FIG. 8B are (A) a plan view and (B) a side view illustrating an example of a specific configuration of the image acquisition apparatus illustrated in FIG. 1.

FIG. 8B is illustrated in an enlarged manner.

FIG. 18A to FIG. 18D are views illustrating flat field correction for a fixed pattern noise in a saturation region.

DESCRIPTION OF THE EMBODIMENTS

Figure 1:
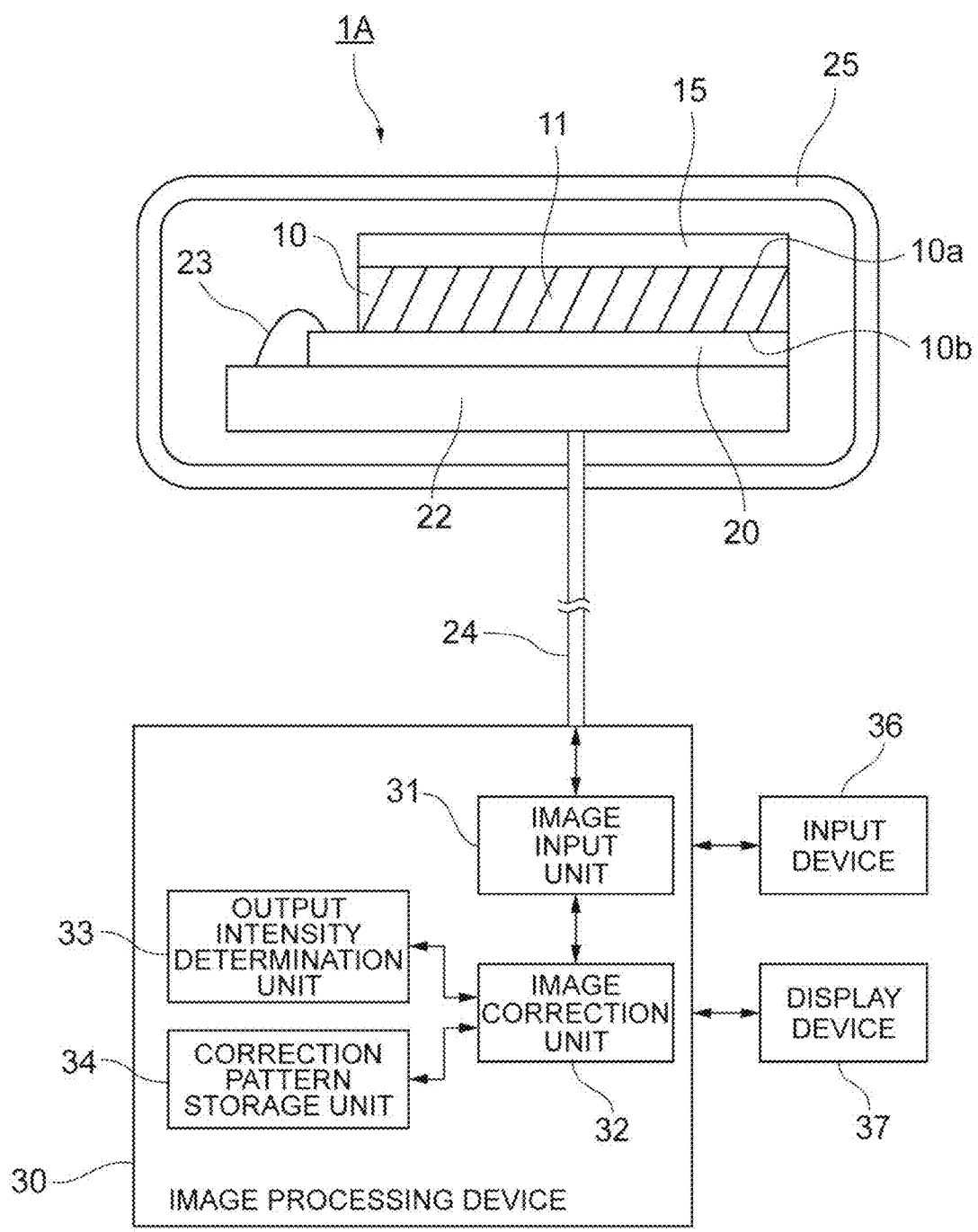
FIG. 1 is a view illustrating a configuration of an embodiment of an image acquisition apparatus.

Hereinafter, embodiments of an image acquisition apparatus and an image acquisition method according to the present invention will be described in detail with reference to the drawings. In the description of the drawings, the same elements will be denoted by the same reference signs, without redundant description. The dimensional ratios in the drawings are not always coincident with those in the description.

FIG. 1 is a view schematically illustrating a configuration of an embodiment of an image acquisition apparatus. An image acquisition apparatus 1A according to the present embodiment includes a fiber optic plate (FOP) 10 that is a fiber optic member, an imaging device 20, a scintillator 15, a support substrate 22, a housing 25, and an image processing device 30. Note that in FIG. 1, for an explanation, a part including the FOP 10, the imaging device 20, and the like is illustrated in a side sectional view and a part including the image processing device 30 is illustrated in a block diagram.

The FOP 10 is an optical element that includes a plurality of optical fibers 11 arrayed two-dimensionally in a predetermined array pitch and that can transmit an optical image with a bundle of these optical fibers 11. The FOP 10 includes an input end face 10a constituted by one end faces of the plurality of optical fibers 11, and an output end face 10b constituted by the other end faces, and transmits an optical image to be imaged, being input from the input end face 10a, to the output end face 10b.

In the configuration example illustrated in FIG. 1, the input end face 10a and the output end face 10b in the FOP 10 are surfaces parallel to each other. Further, the plurality of optical fibers 11 are arrayed in the FOP 10, for example, in such a manner that optical axes thereof are substantially parallel to each other. In the present configuration example, as schematically illustrated in FIG. 1, the optical fibers 11 are arrayed in a manner inclined for a predetermined angle with respect to a direction perpendicular to the input end face 10a and the output end face 10b of the FOP 10, and this array direction of the optical fibers 11 is a transmission direction of an optical image in the FOP 10.

On a side of the input end face 10a of the FOP 10, the scintillator 15 that includes a predetermined scintillation material and that is optically coupled with the input end face 10a is provided. The scintillator 15 is configured such that a surface on the side opposite to the FOP 10 is an incident end face for radiation, and the scintillator converts a radiation image, which enters from the incident end face, such as an X-ray image into an optical image, and inputs the acquired optical image from the input end face 10a into the FOP 10.

The imaging device 20 preferably includes a solid-state imaging device such as a CCD image sensor or a CMOS image sensor and includes a plurality of pixels arrayed two-dimensionally in a predetermined pixel pitch. The imaging device 20 is optically coupled to the output end face 10b of the FOP 10, images an optical image transmitted in the FOP 10 and output from the output end face 10b, and outputs the acquired image as an output image signal (imaging step).

For the imaging device 20, the support substrate 22 is provided on the side opposite to the FOP 10. Accordingly, the imaging device 20, the FOP 10, and the scintillator 15 are supported by the support substrate 22. Further, the substrate 22 and the imaging device 20 are electrically connected to each other by a wire 23, and an output signal from the imaging device 20 is output to the outside through the wire 23, the substrate 22, and a cable 24. Further, in the present configuration example, the imaging device 20, the FOP 10, the scintillator 15, and the support substrate 22 are housed in the housing 25.

The image processing device 30 includes, for example, a computer having a CPU, a memory, and the like, and includes an image input unit 31 for inputting an output signal which is image data output from the imaging device 20 through the cable 24, and an image correction unit 32 for performing correction processing for an input image. Specifically, in the present embodiment, the image correction unit 32 performs, for an image output from the imaging device 20, flat field correction (FFC) for correcting a fixed pattern noise (FPN) due to the FOP 10 and the imaging device 20 (image processing step).

Further, in the image processing device 30 illustrated in FIG. 1, an output intensity determination unit 33 and a correction pattern storage unit 34 are provided for the image correction unit 32. The output intensity determination unit 33 performs determination of output intensity from each pixel of an image which is necessary for determination of a correction condition of flat field correction executed for an object image. Further, a correction pattern used for the flat field correction (flat field frame) is stored in the correction pattern storage unit 34. Further, an input device 36 used for an input of information, an instruction, or the like necessary for image acquisition by an operator and a display device 37 used for displaying an acquired image, and information such as a correction condition to the operator are connected to the image processing device 30. As the input device 36, for example, a keyboard, a mouse, a touch panel, or the like can be used. Note that the image correction unit 32, the output intensity determination unit 33, and the like can be realized, for example, by execution of a predetermined image processing program in the image processing device 30.

Here, as described above, in the configuration of FIG. 1 in which the FOP 10 and the imaging device 20 are combined, a fixed pattern noise in an acquired image includes a component of a sensitivity variation due to a structure and the like of the FOP 10, in addition to a component of a sensitivity variation in each pixel due to a structure, a characteristic, and the like of the imaging device 20, and thus, an influence of the fixed pattern noise on the image is large compared to that in an image acquisition apparatus that does not use the FOP. With respect to this, by performing flat field correction on an object image by using an appropriate correction pattern, it is possible to suppress an influence of the fixed pattern noise including a pattern noise due to the FOP 10.

As to such a fixed pattern noise, for example, calibration measurement of irradiating a whole light receiving surface with light of uniform intensity is performed for the FOP 10 and the imaging device 20, and a fixed pattern noise can be obtained from a variation in output signal intensity from respective pixels in an image acquired in the calibration measurement. Further, it is possible to obtain a correction pattern, which is used for flat field correction, from the fixed pattern noise acquired in such a manner.

For example, when it is assumed that a position of each pixel in an image acquired by the imaging device 20 is (x, y), and an output intensity distribution in an image corresponding to a fixed pattern noise acquired in the calibration measurement is In(x, y), a correction pattern Ic(x, y) is obtained as follows.

$$Ic(x,y)=C/In(x,y)$$

Here, C is an arbitrary constant, and for example, an average value of the output intensity In(x, y) can be used as a constant C. Further, when it is assumed that output intensity of each pixel in an image to be corrected acquired in the main measurement is Ia(x, y), output intensity Ib(x, y) in an image after the flat field correction can be obtained as follows.

$$Ib(x,y)=Ia(x,y)\times Ic(x,y)$$

Note that in the image acquisition in the calibration measurement or in the main measurement, a background image may be acquired separately and image processing of subtracting that, or the like may be performed when necessary.

Figure 2:
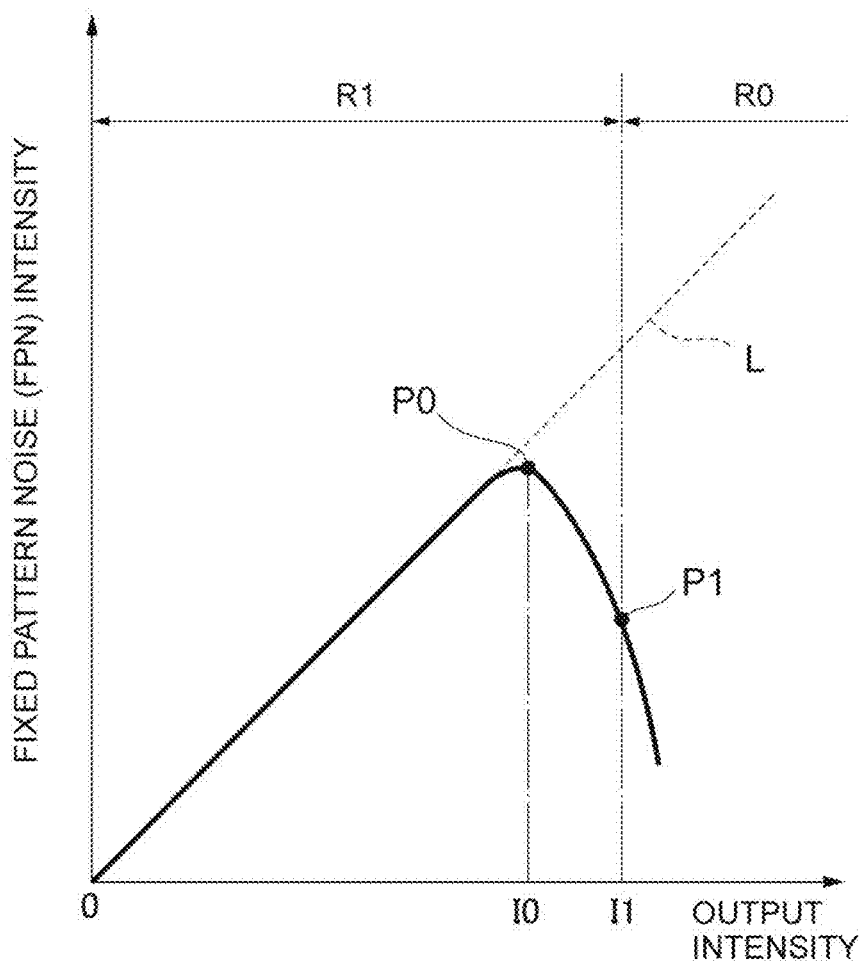
FIG. 2 is a graph schematically illustrating an example of a relationship between output intensity and fixed pattern noise intensity, and of flat field correction.

FIG. 2 is a graph schematically illustrating an example of a relationship between output intensity and fixed pattern noise intensity (FPN intensity), and of flat field correction executed in the image correction unit 32. In the graph of FIG. 2, a horizontal axis indicates output intensity of an output image signal from a pixel of an image, and a vertical axis indicates FPN intensity. The FPN intensity on the vertical axis is obtained in the image, which is acquired in the above-described calibration measurement, by a standard deviation of output intensities in all pixels or a plurality of pixels in a partial region (for example, 100 pixels×100 pixels) of the imaging device 20.

The FPN in an image acquired by the imaging device 20 is constant in a linear region in which output intensity varies linearly with respect to input light intensity into a pixel, and at this time, as indicated by a dashed straight line L in FIG. 2, the FPN intensity varies in a manner proportional to the output intensity and the FPN intensity expressed by a ratio to the output intensity is substantially a constant value (for example, about 8% in configuration example described later). On the other hand, when output intensity from a pixel is increased and becomes close to a saturation region, the FPN intensity is deviated from a proportional relationship, and when the output intensity is further increased, the FPN intensity starts to decrease. In the graph of FIG. 2, a point P0 is a noise peak point in a variation in FPN intensity with respect to a variation in output intensity.

With reference to the noise peak point P0 in a correlation between the output intensity and the FPN intensity, a first switching point P1 for switching a correction condition of flat field correction is set in the image correction unit 32 of the image processing device 30 illustrated in FIG. 1 on the basis of the noise peak point P0. Further, for flat field correction on each of a plurality of pixels in an image to be corrected, determination of output intensity I from an object pixel is performed in the output intensity determination unit 33. Then, the image correction unit 32 performs the flat field correction by a predetermined correction pattern, which is stored in the correction pattern storage unit 34, in a region R1 in which output intensity I from the object pixel is lower than first switching intensity I1 at the first switching point P1, and further, the image correction unit does not perform the flat field correction using the correction pattern in a region R0 in which the output intensity I is higher than the first switching intensity I1.

Figure 3:
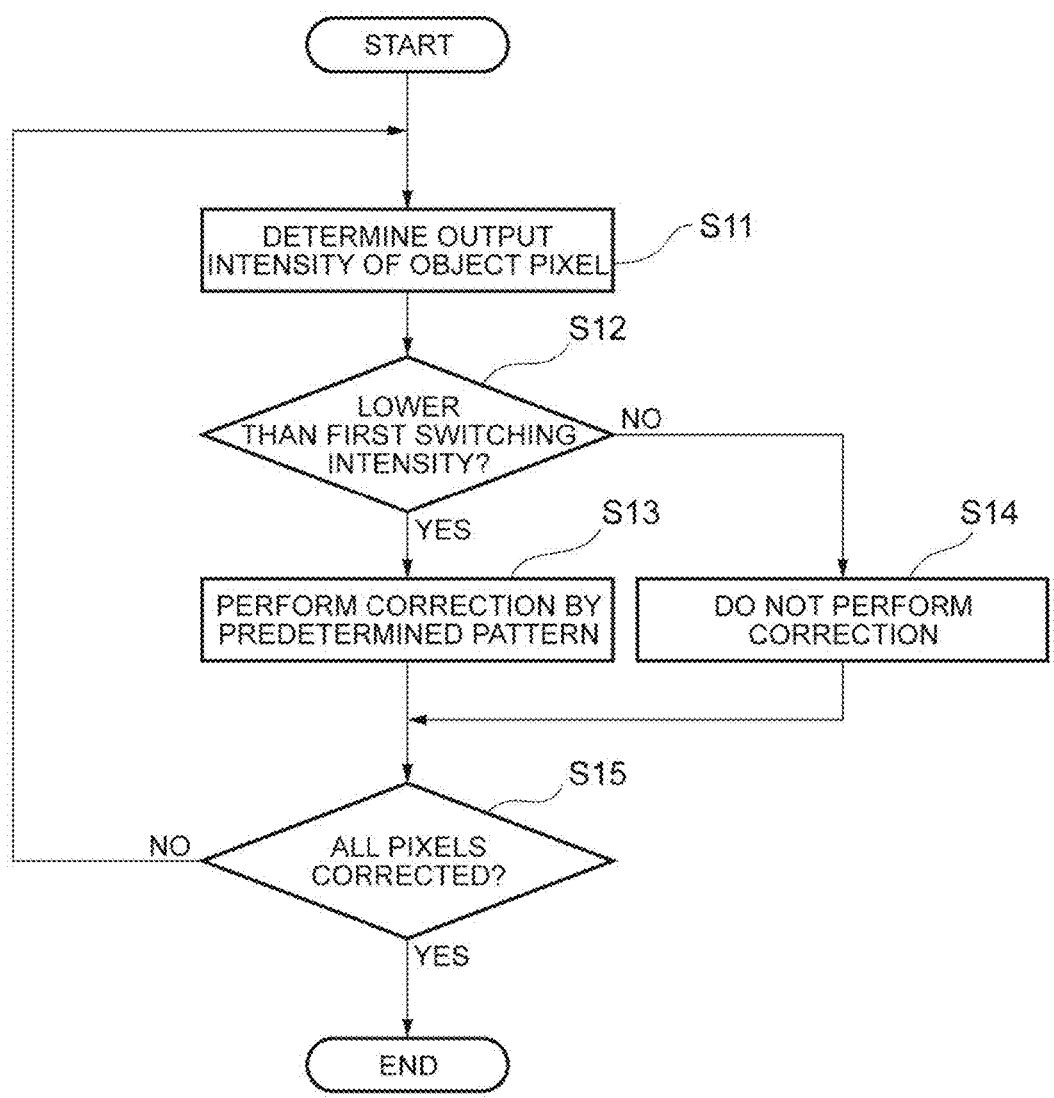
FIG. 3 is a flowchart illustrating an example of an image acquisition method.

FIG. 3 is a flowchart illustrating an example of an image acquisition method executed in the image acquisition apparatus 1A illustrated in FIG. 1. In the method illustrated in FIG. 3, first, determination for output intensity of an image signal in an object pixel in an image to be corrected is performed (step S11), and it is determined whether output intensity I is lower than first switching intensity I1 at a first switching point P1 (S12). Then, in a case where the output intensity I is lower than the first switching intensity I1, flat field correction is performed by a predetermined correction pattern (S13). On the other hand, in a case where the output intensity I is higher than the first switching intensity I1, the flat field correction is not performed for the pixel (S14).

When the determination of the output intensity and the flat field correction for the object pixel are over, it is checked whether the flat field correction is performed for all of a plurality of pixels included in the image (S15), and when there is a pixel on which the correction is not performed yet, steps S11 to S14 are repeatedly performed for the object pixel. On the other hand, when the correction is performed for all pixels of the image, processing of the flat field correction for the image is ended.

Effects of the image acquisition apparatus 1A and the image acquisition method according to the present embodiment will be described.

In the image acquisition apparatus 1A and the image acquisition method illustrated in FIG. 1 to FIG. 3, the fiber optic plate 10 that includes the plurality of optical fibers 11 and that transmits an optical image from the input end face 10a to the output end face 10b, and the imaging device 20 including the plurality of pixels are combined, and the flat field correction is performed in the image processing device 30 for an image acquired by the imaging device 20. Accordingly, it is possible to suppress an influence of a fixed pattern noise in an image to be corrected due to a structure, a characteristic, and the like of the fiber optic plate 10 and the imaging device 20.

Moreover, as illustrated in FIG. 2, in such a configuration, a first switching point P1 of flat field correction is set with reference to a noise peak point P0 in a variation in fixed pattern noise intensity with respect to a variation in output intensity, the flat field correction is performed in a region R1 in which output intensity is lower than that at the first switching point P1, and the correction is not performed in a region R0 in which output intensity is higher than that at the first switching point P1. In such a manner, according to a configuration in which the flat field correction using a correction pattern is not performed in the region R0 in which output intensity is high in a saturation region exceeding the noise peak point P0, it becomes possible to suppress generation of a reverse pattern of a fixed pattern noise due to correction in the saturation region and to suitably perform the flat field correction on an image as a whole.

FIG. 4A to FIG. 4D are views illustrating flat field correction for a fixed pattern noise in a linear region, and generation of a reverse pattern due to the flat field correction in a saturation region. Here, it is assumed that FPN intensity expressed by a ratio to output intensity in a linear region is 8%, and output intensities in four pixels included in an image are 100, 108, 108, and 92 with the intensity in an upper left pixel being 100, as illustrated in FIG. 4A. When flat field correction is performed for such an image by a correction pattern corresponding to the FPN intensity of 8%, an image with uniform sensitivity is acquired as illustrated in FIG. 4B.

On the other hand, when output intensity from each pixel of the image is increased and enters a saturation region, the FPN intensity is decreased after a noise peak point P0 (see FIG. 2). For example, in FIG. 4C, the output intensities from the pixels of an image are 100, 102, 102, and 98, and the FPN intensity is decreased to 2%. When the flat field correction is performed for such an image by a correction pattern similar to that in the linear region, the output intensities in an image after correction become 100, 94, 94, and 106, and a reverse pattern of a fixed pattern noise is generated due to excessive correction as illustrated in FIG. 4D.

With respect to this, as described above, with a configuration of switching whether to execute flat field correction at a first switching point P1 set on the basis of a noise peak point P0 in a variation in FPN intensity, it is possible to suppress generation of such a reverse pattern. Further, with a configuration of not performing flat field correction in a region in which output intensity is a certain degree or more, it is possible to simplify correction processing for an image.

Here, as to the first switching point P1 for switching a correction condition of the flat field correction set in the image processing device 30, in general, it is preferable that a point which has output intensity of peak output intensity I0 at the noise peak point P0 or more is set as the first switching point P1.

Further, as to the first switching point P1, specifically for example, a configuration of setting, as the first switching point P1, a point which has output intensity I higher by 5% than the peak output intensity I0 at the noise peak point P0 can be used. Immediately after the output intensity I from a pixel exceeds the peak point P0, the FPN intensity is still high, however, when the output intensity I becomes higher than the peak output intensity TO by 5%, the FPN intensity becomes low, for example, to 2 to 3% with respect to the output intensity I, and FPN becomes not noticeable in an image. Thus, by setting the first switching point P1 in the above manner, it is possible to suitably switch whether to execute the flat field correction.

Alternatively, as to the first switching point P1, a configuration of setting, as the first switching point P1, a point which has the output intensity I higher than the peak output intensity I0 at the noise peak point P0 and at which FPN intensity expressed by a ratio to the output intensity I is decreased to 2% may be employed. With such a configuration, it is also possible to suitably switch whether to execute the flat field correction in a similar manner.

Further, in the embodiment illustrated in FIG. 1, the image acquisition apparatus 1A is configured to include the scintillator 15, which is optically coupled to the input end face 10a of the fiber optic plate 10, in addition to the fiber optic plate 10 and the imaging device 20. In such a manner, according to the image acquisition apparatus 1A with a configuration including the scintillator 15, for example, it is possible to suitably acquire an image by a radiation image such as an X-ray image. Such an image acquisition apparatus can be used, for example, as an X-ray image acquisition apparatus to perform photographing of teeth in a mouth.

Further, this scintillator 15 may not be provided when not necessary, for example, in a case where an optical image is directly imaged. Such an image acquisition apparatus that does not include a scintillator can be used as an image acquisition apparatus for detecting a depressed/protruded pattern of a fingerprint, or the like.

Figure 5:
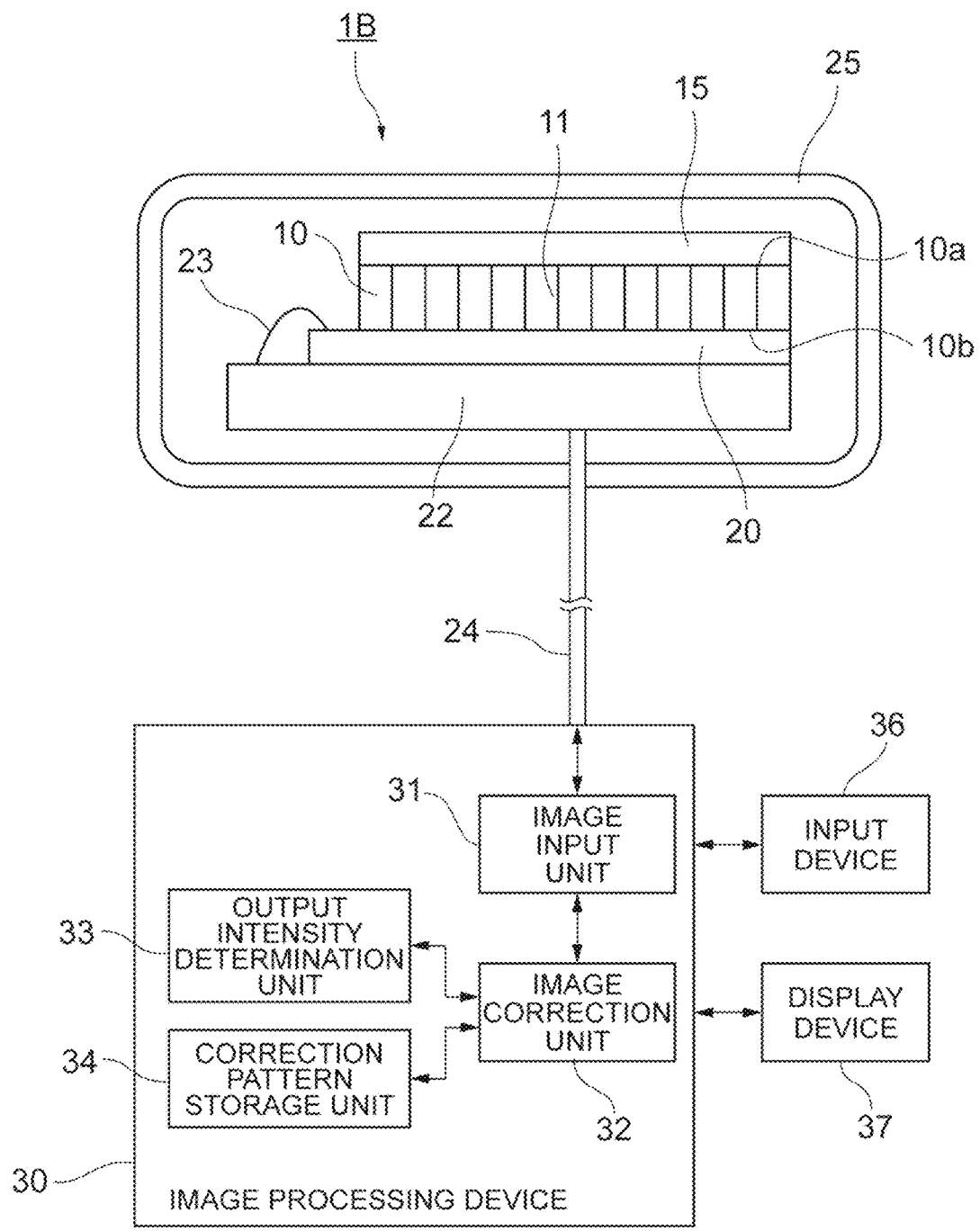
FIG. 5 is a view illustrating a configuration of a modification example of the image acquisition apparatus illustrated in FIG. 1.

Further, in the image acquisition apparatus 1A illustrated in FIG. 1, a configuration in which the optical fibers 11 included in the FOP 10 are arrayed in a manner inclined for a predetermined angle with respect to a direction perpendicular to the input end face 10a and the output end face 10b of the FOP 10 is described as an example, however, an array of the optical fibers 11 in the FOP 10 is not limited to such a configuration. For example, as illustrated in a configuration of an image acquisition apparatus 1B of a modification example in FIG. 5, the optical fibers 11 included in the FOP 10 may be arrayed in such a manner as to be extended perpendicularly with respect to the input end face 10a and the output end face 10b of the FOP 10.

Figure 6:
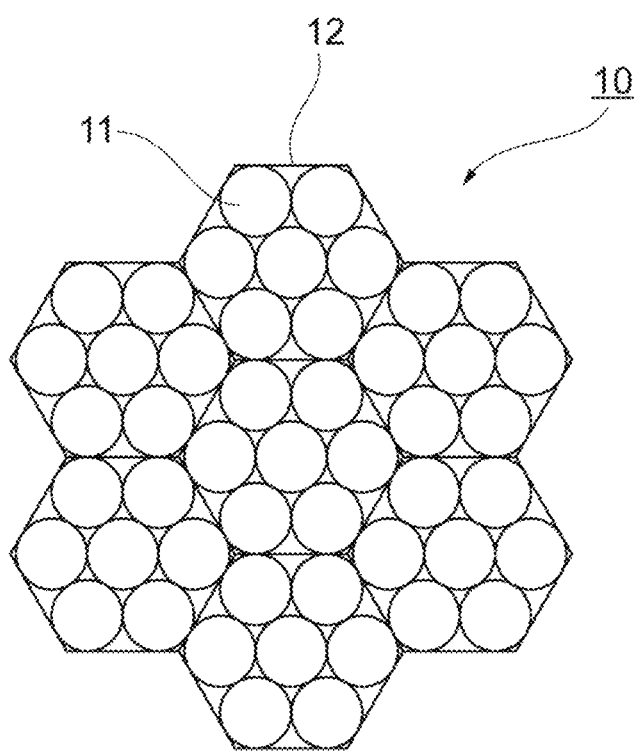
FIG. 6 is a view illustrating a configuration of a fiber optic plate, and generation of a fixed pattern noise due to the fiber optic plate.

Next, generation of a fixed pattern noise by a sensitivity variation due to a structure and the like of the FOP 10 will be described in detail. FIG. 6 is a view schematically illustrating a configuration of the FOP 10, and generation of a fixed pattern noise by the FOP 10. For example, a plurality of optical fibers 11 are bundled to be an optical fiber bundle 12 with a section having a predetermined shape (hexagonal shape in example of FIG. 6), and further, a plurality of optical fiber bundles 12 are tiled, whereby the FOP 10 is configured.

In a case where the FOP 10 with such a configuration is used in combination with an imaging device 20, a pattern of a boundary surface of the optical fibers 11 or a boundary surface of the optical fiber bundles 12 acquired by bundling of the plurality of optical fibers 11 appears as a fixed pattern noise (FPN) in an image acquired by the imaging device 20.

Further, in the FOP 10 with such a configuration, when the optical fibers 11 are bundled to be the optical fiber bundle 12 or when the optical fiber bundles 12 are tiled to be the FOP 10, there is a case where the optical fibers 11 collapse on the boundary surface. In such a case, in a boundary portion where the optical fiber 11 collapses, input light amount into the optical fiber 11 is decreased compared to that into a different optical fiber 11, and thus, FPN intensity is increased. Further, there is a case where glass or the like to absorb light is inserted between the optical fibers 11 in order to suppress crosstalk between the optical fibers 11, however, there is a case where such light absorption glass also contributes to an increase of FPN intensity.

Figure 7A:
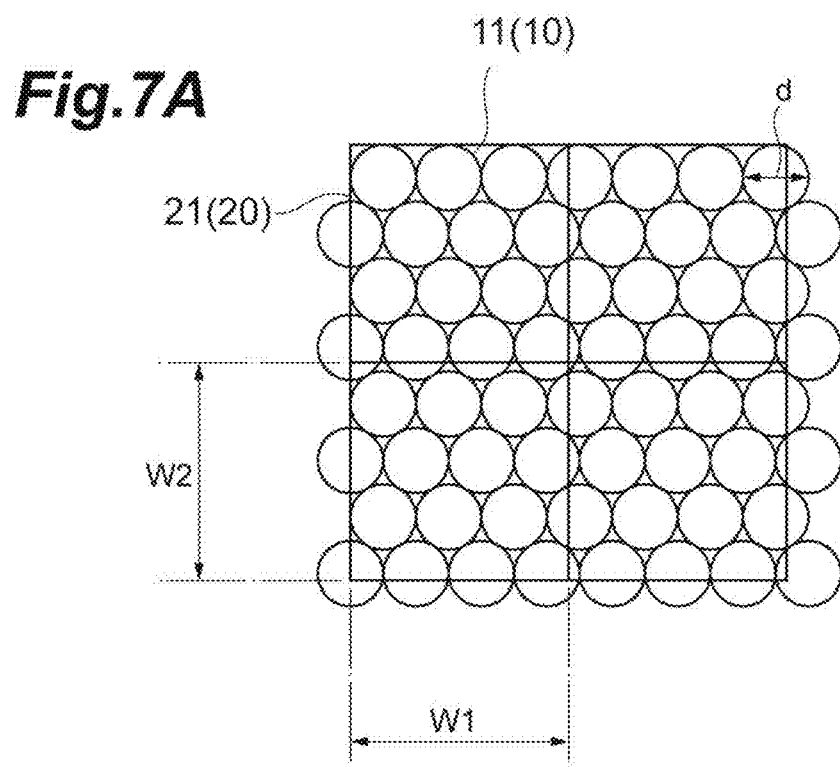
FIG. 7A and FIG. 7B are views illustrating a correspondence relationship between an optical fiber in the fiber optic plate and a pixel in an imaging device.
Figure 7B:
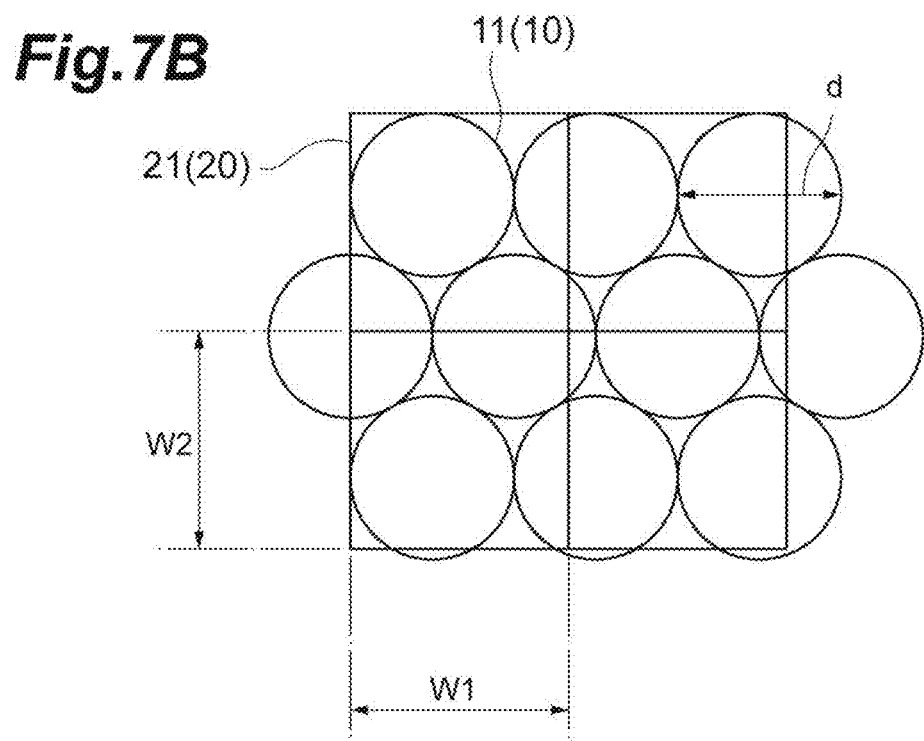

Further, FIG. 7A and FIG. 7B are views illustrating a correspondence relationship between the optical fibers 11 in the FOP 10 and the pixels 21 in the imaging device 20, FIG. 7A is a view illustrating a configuration in which the optical fibers 11 with a diameter d=6 μm are arrayed for the pixels 21 with a pixel size of w1×w2=20 μm×20 μm, and FIG. 7B is a view illustrating a configuration in which the optical fibers 11 with a diameter d=15 μm are arrayed for the pixels 21 with the same size.

As it is understood from FIG. 7A and FIG. 7B, when the size of the optical fiber 11 or the optical fiber bundle 12 in the FOP 10 is large with respect to the size of the pixel 21 in the imaging device 20, a pattern of a boundary surface thereof becomes large and noticeable, and FPN intensity in an image acquired by the imaging device 20 is increased. Further, FPN in such a case also becomes visually noticeable in the image. Further, as illustrated in FIG. 1, in a case where the optical fibers 11 are arrayed in an inclined manner in the FOP 10, the end face of the optical fiber 11 becomes large, and thus, FPN becomes noticeable. In flat field correction executed in the image processing device 30, it is necessary to perform the correction in consideration of such an influence by the structure of the FOP 10.

Next, a configuration example of the image acquisition apparatus illustrated in FIG. 1 will be described. FIG. 8A and FIG. 8B are (A) a plane view and (B) a side view illustrating an example of a specific configuration of the image acquisition apparatus. In the configuration example illustrated in FIG. 8A and FIG. 8B, an imaging device 20 which includes a CMOS chip, and a scintillator element in which an FOP 10 and a scintillator 15 are integrated, are arranged on a support substrate 22. An effective imaging area in the present configuration example is a1×a2=20 mm×30 mm. Further, a height of an element including the FOP 10, the scintillator 15, and the imaging device 20 is h=1.7 mm. Further, in the CMOS chip of the imaging device 20, a pixel size is 20 μm×20 μm and the number of pixels is 1000 pixels×1500 pixels.

Figure 9:
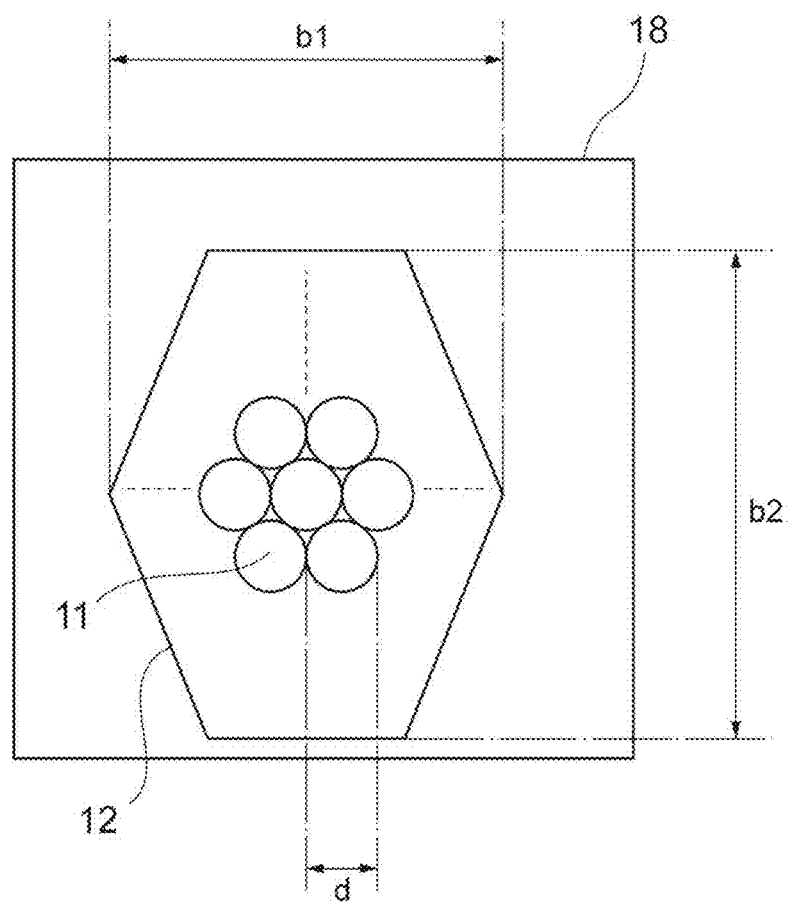
FIG. 9 is a plan view in which a part of a configuration of a fiber optic plate in the image acquisition apparatus illustrated in FIG. 8A

Further, FIG. 9 is a plane view in which a part of a configuration of the FOP 10 in the image acquisition apparatus illustrated in FIG. 8A and FIG. 8B is illustrated in an enlarged manner. In FIG. 9, a configuration of a hexagonal optical fiber bundle 12 in the FOP 10 included in a region indicated by a quadrangular frame 18 in FIG. 8A is illustrated. In the present configuration example, an optical fiber with a diameter d=15 μm is used as an optical fiber 11 included in the FOP 10. Further, the size of the optical fiber bundle 12 that is a bundle of a plurality of optical fibers 11 is b1=1600 μm and b2=2800 μm in FIG. 9. Further, an inclination angle of the optical fibers 11 in the FOP 10 (see FIG. 1) is 30° to 40°.

Next, an output characteristic, a fixed pattern noise characteristic, and the like in an image acquired by the image acquisition apparatus 1A having a configuration illustrated in FIG. 1, FIG. 8A, FIG. 8B, and FIG. 9 will be described.

Figure 10:
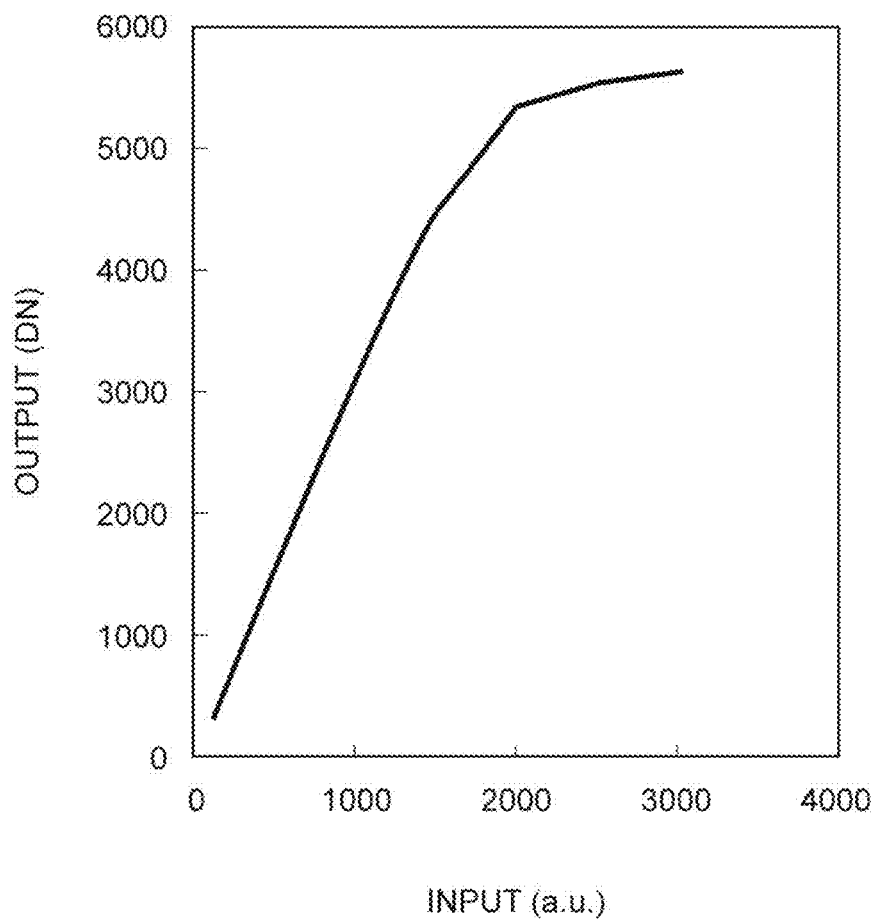
FIG. 10 is a graph illustrating a variation in output intensity with respect to a variation in input light intensity.

FIG. 10 is a graph illustrating a variation in output intensity with respect to a variation in input light intensity. In the graph of FIG. 10, a horizontal axis indicates input light intensity (a.u.), and a vertical axis indicates output intensity (DN, digital output value) of an image signal from the imaging device 20. As illustrated in FIG. 10, in a linear region with low input light intensity, the output intensity is increased linearly along with an increase in the input light intensity. On the other hand, when the input light intensity becomes high and enters a saturation region, the output intensity is gradually saturated and is not increased linearly.

Figure 11:
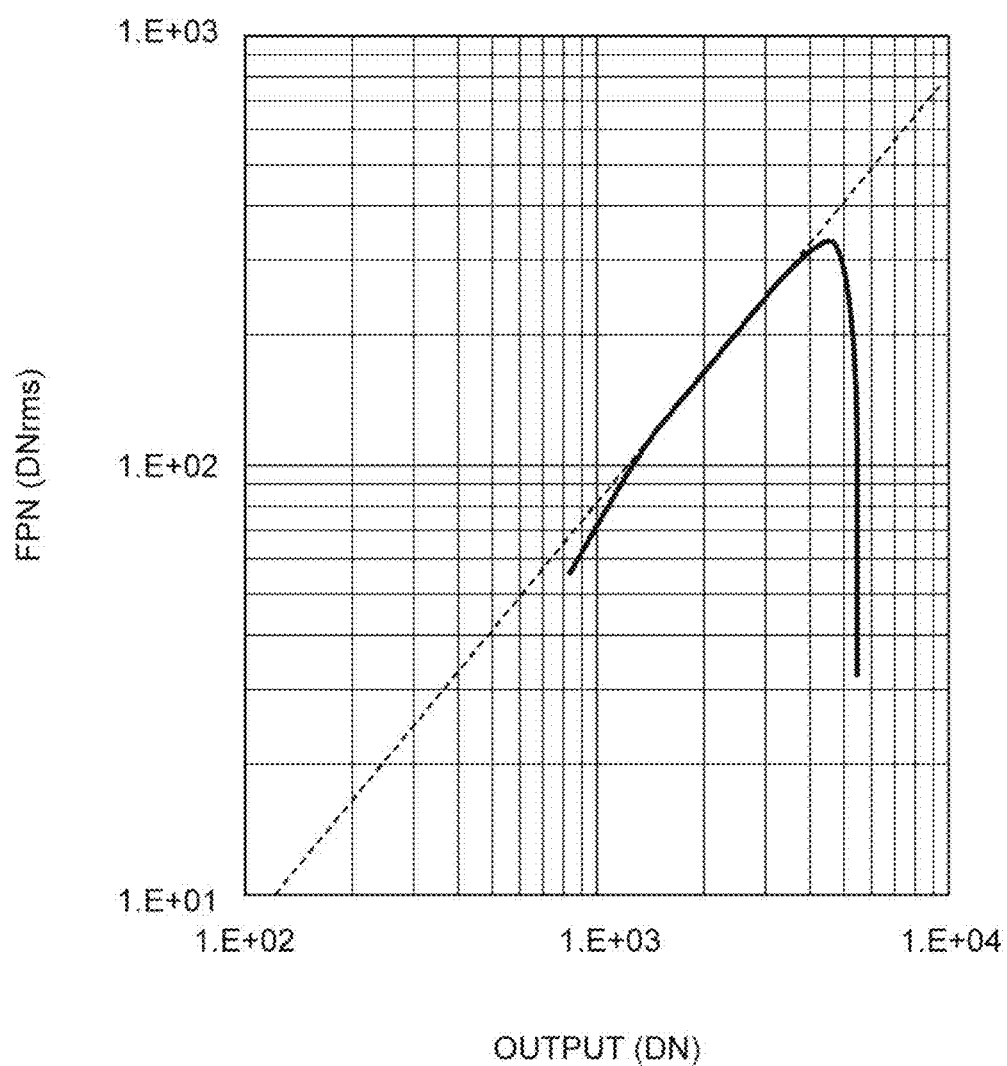
FIG. 11 is a graph illustrating a variation in fixed pattern noise intensity with respect to a variation in output intensity.
Figure 12:
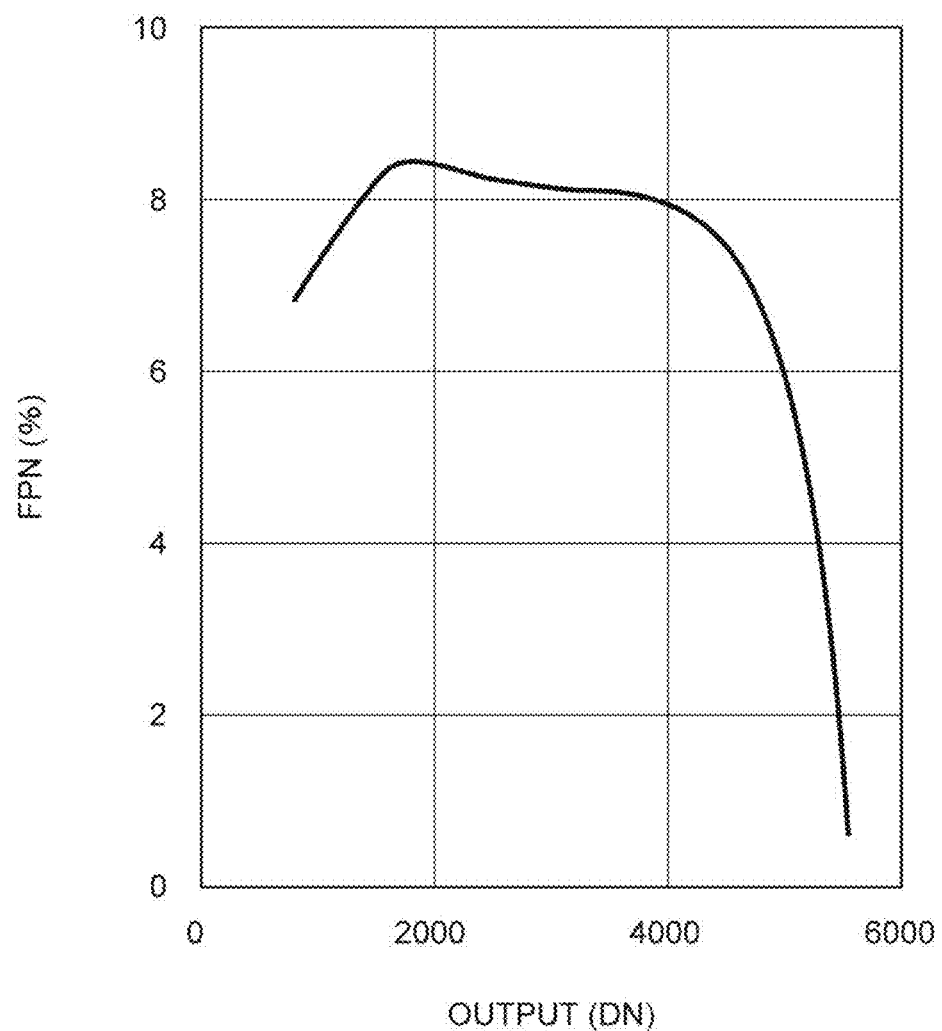
FIG. 12 is a graph illustrating a variation in fixed pattern noise intensity with respect to a variation in output intensity.

Each of FIG. 11 and FIG. 12 is a graph illustrating a variation in fixed pattern noise (FPN) intensity with respect to a variation in output intensity. In the graph of FIG. 11, a horizontal axis indicates output intensity (DN), and a vertical axis indicates FPN intensity (DNrms, standard deviation of digital output value). Further, in the graph of FIG. 12, a horizontal axis indicates output intensity (DN), and a vertical axis indicates FPN intensity (%) expressed by a ratio to the output intensity. As described above with reference to FIG. 2, FPN intensity in a linear region is about 8% in the graphs illustrated in FIG. 11 and FIG. 12, however, when output intensity is increased and enters a saturation region, the FPN intensity starts to decrease after a noise peak point.

Figure 13:
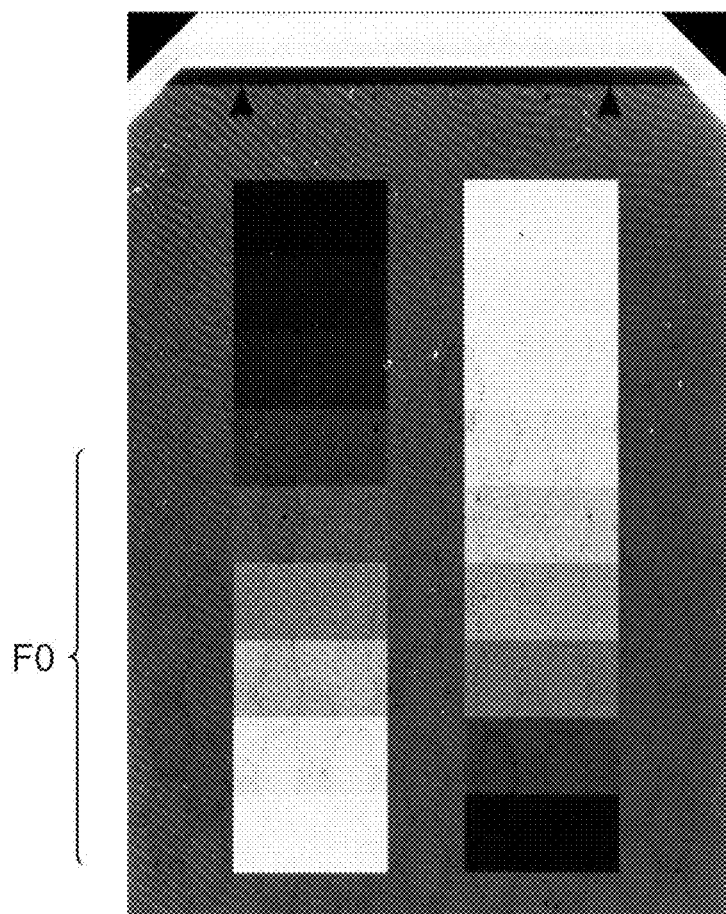
FIG. 13 is a view illustrating an example of an image before flat field correction acquired by the imaging device.

FIG. 13 is a view illustrating an example of an image before flat field correction acquired by the imaging device. In FIG. 13, an image acquired with a gray chart for test as an imaging object and by utilization of light with a wavelength 626 nm from an LED light source is illustrated. Further, FIG. 14 is a view in which a part of an image before correction illustrated in FIG. 13 is illustrated in an enlarged manner, and an image in a region F0 in a pattern on a left side of the image illustrated in FIG. 13 is illustrated in an enlarged manner.

Figure 14:
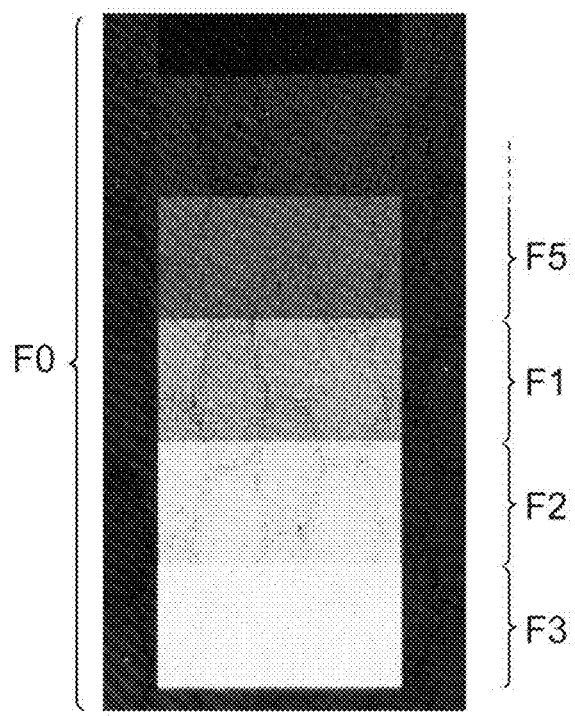
FIG. 14 is a view in which a part of the image before correction illustrated in FIG. 13 is illustrated in an enlarged manner.

In the image of FIG. 14, input light intensity and output intensity in each pixel of the image are increased from an upper side toward a lower side, and a region F1 is a region in the vicinity of a noise peak point P0 (see FIG. 2). Further, a region F5 on an upper side of the region F1 corresponds to a linear region, and each of regions F2 and F3 on a lower side of the region F1 corresponds to a saturation region. FPN intensity in the region F5 in the linear region and the region F1 in the vicinity of the peak point P0 is about 8%. Further, FPN intensity in the region F2 in the saturation region in which FPN intensity is decreased is about 4% and FPN intensity in the region F3 is about 2%.

In the image of FIG. 14, a fixed pattern noise due to a structure of the hexagonal optical fiber bundle 12 in the FOP 10 can be recognized clearly in the regions F5 and F1. Further, a fixed pattern noise can be recognized in the region F2 in which the FPN intensity is decreased to 4%. On the other hand, it is difficult to visually recognize a fixed pattern noise in the region F3 in which the output intensity is high and the FPN intensity is decreased to 2%.

Figure 15:
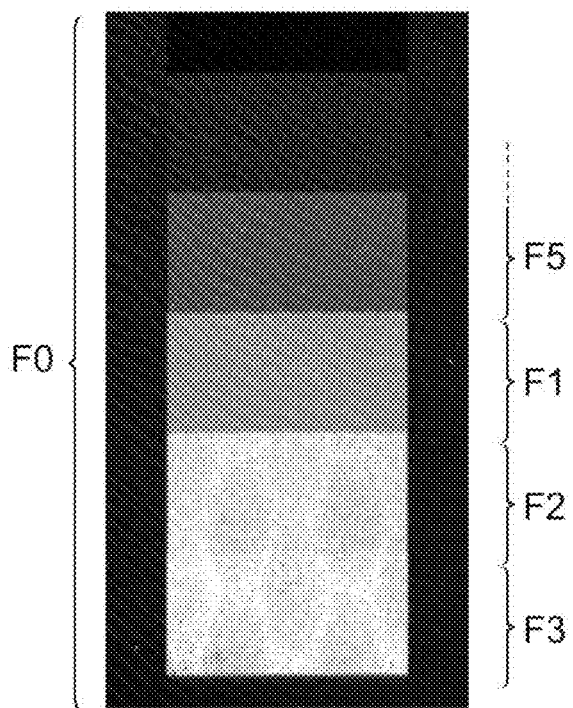
FIG. 15 is a view illustrating an example of an image acquired by performing the flat field correction for the image illustrated in FIG. 14.

FIG. 15 is a view illustrating an example of an image acquired by performing flat field correction on the image illustrated in FIG. 14 by utilization of a single correction pattern. In the image of FIG. 15, an influence of a fixed pattern noise is adequately suppressed in the regions F5 and F1 by the flat field correction. On the other hand, in the regions F2 and F3 in the saturation region, a reverse pattern of a fixed pattern noise is generated by excessive correction as a result of flat field correction by a correction pattern same as that in the linear region.

With respect to this, as described above, with a configuration of switching whether to execute flat field correction at a first switching point P1 set on the basis of a noise peak point P0 in a variation in FPN intensity, it becomes possible to suppress generation of a reverse pattern illustrated in FIG. 15, and to suitably perform the flat field correction on an image as a whole.

Figure 16:
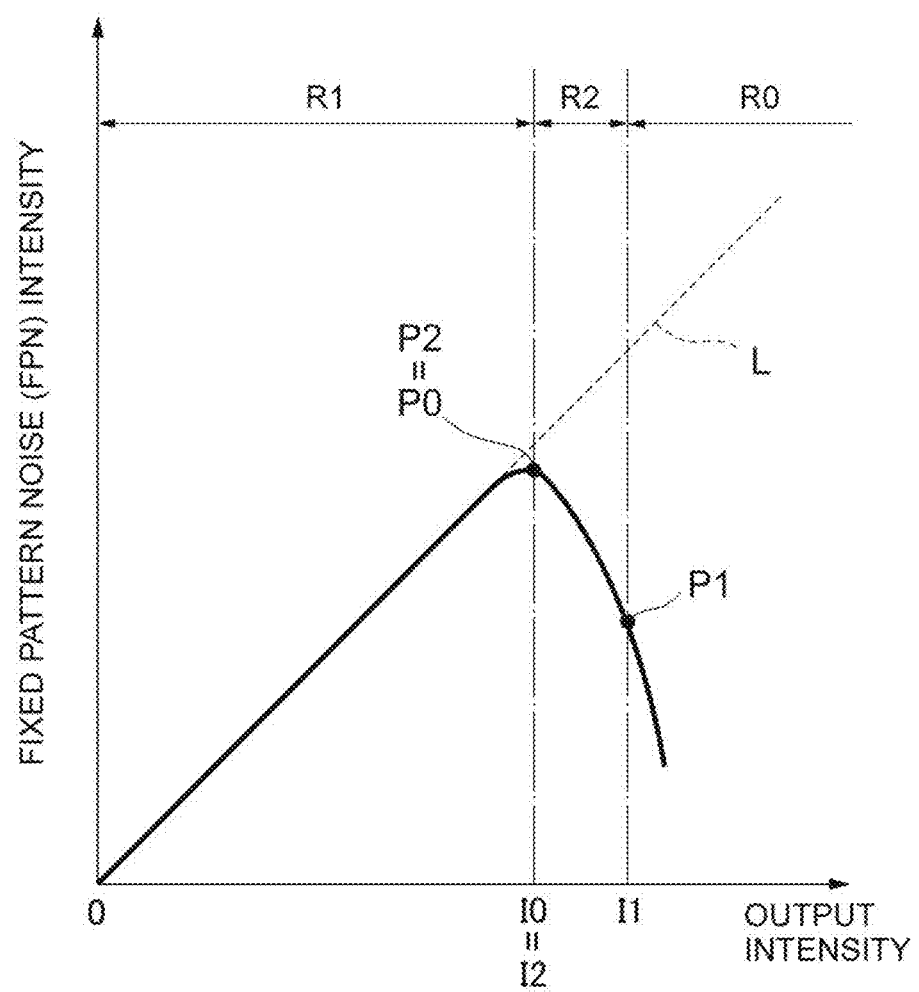
FIG. 16 is a graph schematically illustrating another example of a relationship between output intensity and fixed pattern noise intensity, and of flat field correction.

Configurations of the image acquisition apparatus 1A and the image acquisition method according to the above embodiment will be further described. FIG. 16 is a graph schematically illustrating another example of a relationship between output intensity and FPN intensity, and of flat field correction executed in the image correction unit 32.

In the present configuration example, in the image correction unit 32 of the image processing device 30 illustrated in FIG. 1, a noise peak point P0 in a correlation between output intensity and FPN intensity is referred to, a first switching point P1 of flat field correction is set on the basis of the noise peak point P0, and further, a second switching point P2 having second switching intensity I2 lower than first switching intensity I1 at the first switching point P1 is set. In FIG. 16, as an example of setting of the second switching point, the noise peak point P0 is set as the second switching point P2.

Further, for flat field correction on each of a plurality of pixels in an image to be corrected, determination of output intensity I from an object pixel is performed in the output intensity determination unit 33. Then, the image correction unit 32 performs flat field correction by a first correction pattern, which is stored in the correction pattern storage unit 34, in a region R1 in which output intensity I from an object pixel is lower than the second switching intensity I2, performs flat field correction by a second correction pattern different from the first correction pattern in a region R2 in which the output intensity I is higher than the second switching intensity I2 and lower than the first switching intensity I1, and does not perform flat field correction using a correction pattern in a region R0 in which the output intensity I is higher than the first switching intensity I1.

Figure 17:
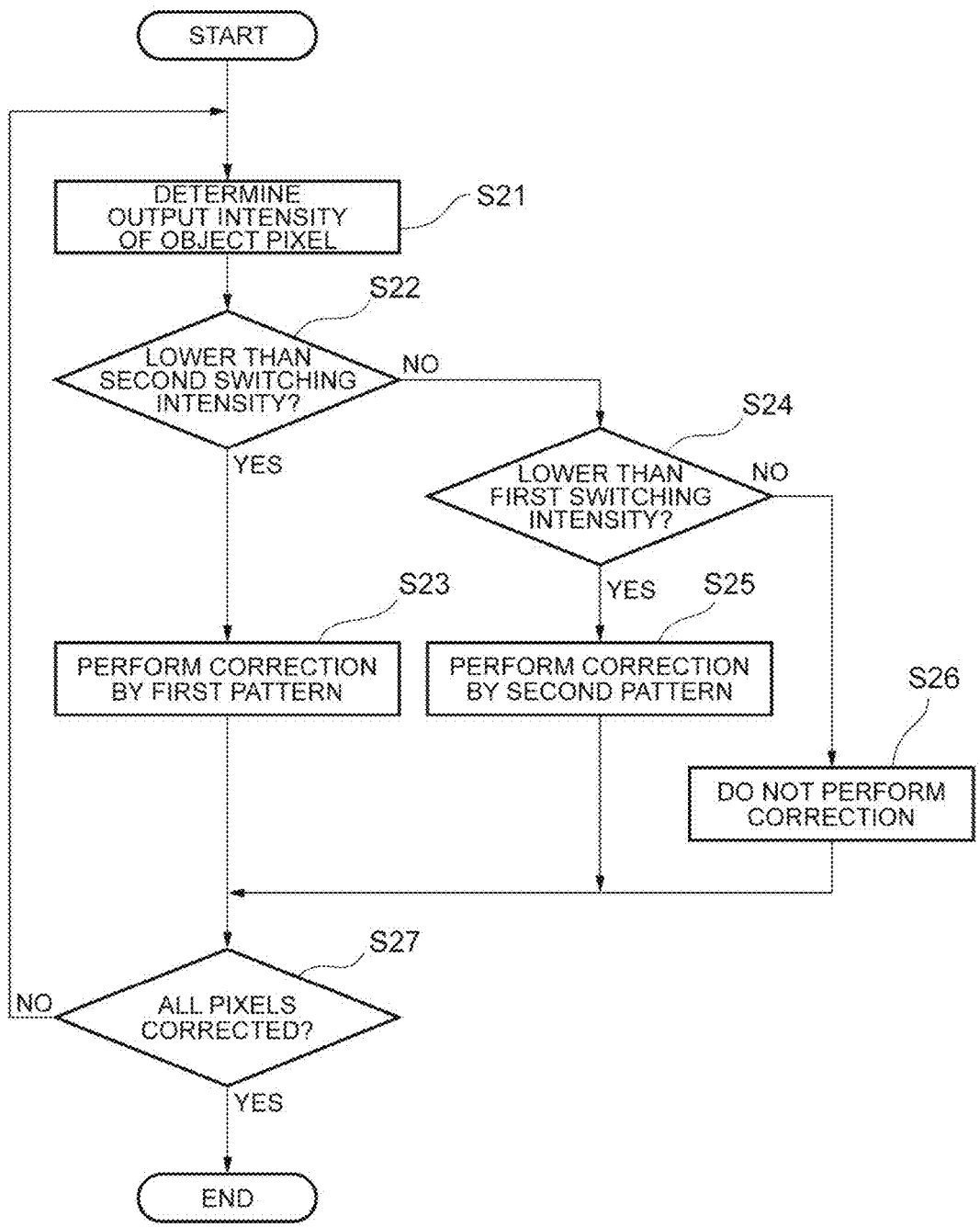
FIG. 17 is a flowchart illustrating another example of an image acquisition method.

FIG. 17 is a flowchart illustrating another example of an image acquisition method executed in the image acquisition apparatus 1A illustrated in FIG. 1. In the method illustrated in FIG. 17, first, determination for output intensity of an image signal in an object pixel in an image to be corrected is performed (step S21), and it is determined whether output intensity I is lower than second switching intensity I2 at a second switching point P2 (S22). Then, in a case where the output intensity I is lower than the second switching intensity I2, flat field correction is performed by a first correction pattern (S23).

Subsequently, in a case where the output intensity I is higher than the second switching intensity I2, it is determined whether the output intensity I is lower than first switching intensity I1 at a first switching point P1 (S24). Then, in a case where the output intensity I is lower than the first switching intensity I1, flat field correction is performed by a second correction pattern (S25). On the other hand, in a case where the output intensity I is higher than the first switching intensity I1, flat field correction is not performed for the pixel (S26).

When the determination of output intensity and the flat field correction for the object pixel are over, it is checked whether the flat field correction is performed for all of the plurality of pixels included in the image (S27), and when there is a pixel on which the correction is not performed yet, steps S21 to S26 are repeatedly performed for the object pixel. On the other hand, when the correction is performed for all pixels of the image, processing of the flat field correction for the image is ended.

In the configuration illustrated in FIG. 16 and FIG. 17, two switching points of the second switching point P2 and the first switching point P1 are set for the flat field correction with reference to the noise peak point P0 in a variation of the FPN intensity, the first correction pattern is used in the region R1 in which the output intensity is lower than that at the second switching point P2, the second correction pattern is used in the region R2 between the second switching point P2 and the first switching point P1, and the correction is not performed in the region R0 in which the output intensity is higher than that at the first switching point P1.

According to such a configuration, a region in which output intensity is lower than that at the first switching point P1 is divided into two regions R1 and R2 by the second switching point P2, and flat field correction is performed in these regions R1 and R2 by utilization of different correction patterns, and thus, it becomes possible to perform the flat field correction on an image more accurately as a whole.

FIG. 18A to FIG. 18D are views illustrating flat field correction for a fixed pattern noise in a saturation region. Here, a point at which the FPN intensity expressed by a ratio to the output intensity is decreased to 4% in the region R2 between the second switching point P2 and the first switching point P1 is assumed, and as illustrated in FIG. 18A, output intensities in four pixels included in an image are 100, 104, 104, and 96, with the intensity in an upper left pixel as 100. When flat field correction is performed for such an image by a correction pattern corresponding to FPN intensity of 8% similarly to a linear region, a reverse pattern of a fixed pattern noise is generated by excessive correction as illustrated in FIG. 18B.

With respect to this, in a case where flat field correction is performed by a correction pattern corresponding to FPN intensity of 6% and different from that in the linear region, it is possible to suppress generation of a reverse pattern of a fixed pattern noise as illustrated in FIG. 18C. Further, in a case where flat field correction is performed by a correction pattern corresponding to FPN intensity of 4%, it is possible to further suppress generation of a reverse pattern of a fixed pattern noise as illustrated in FIG. 18D.

Here, as to the second switching point P2 for switching a correction condition of the flat field correction, specifically for example, as illustrated as an example in FIG. 16, a configuration of setting the noise peak point P0 as the second switching point P2 can be used. Further, as to the second switching point P2, a point, which is other than the noise peak point P0, such as a predetermined point between the noise peak point P0 and the first switching point P1 may be set as the second switching point P2. Note that setting of the first switching point P1 is in the manner described above with reference to the configuration illustrated in FIG. 2 and FIG. 3.

Further, as to the switching point of the flat field correction, a configuration in which one or a plurality of switching points of the flat field correction is set between the second switching point P2 and the first switching point P1 in addition to the above-described first switching point P1 and the second switching point P2, and three or more types of correction patterns are switched and used, may be employed.

In an example of such a configuration, in a configuration in which FPN intensity in a linear region is 8%, and a point at which output intensity is higher than that at a noise peak point P0 and FPN intensity is decreased to 2% is set as a first switching point P1, a point at which output intensity is higher than that at the noise peak point P0 and FPN intensity is decreased to 6% is set as a second switching point P2, and a point at which output intensity is higher than that at the noise peak point P0 and FPN intensity is decreased to 4% is set as a third switching point P3.

Then, with respect to flat field correction on an image, the following configuration is employed, that is, a first correction pattern corresponding to the FPN intensity of 8% is used in a region in which output intensity is lower than that at the second switching point P2, a second correction pattern corresponding to the FPN intensity of 6% is used in a region between the second switching point P2 and the third switching point P3, a third correction pattern corresponding to the FPN intensity of 4% is used in a region between the third switching point P3 and the first switching point P1, and correction is not performed in a region in which output intensity is higher than that at the first switching point P1. In such a manner, it is possible to perform flat field correction for an image more accurately by setting three or more switching points for the flat field correction, performing switching of a correction pattern, and switching whether to execute the correction.

The image acquisition apparatus and the image acquisition method according to the present invention are not limited to the above-described embodiments and configuration examples, and various modifications can be made. For example, the housing 25 that houses the imaging device 20, the FOP 10, and the like may not be provided when not necessary. Further, as a specific configuration of each of the imaging device 20, the FOP 10, the image processing device 30, and the like, various configurations may be used other than the above-described configurations.

An image acquisition apparatus according to the above embodiment includes (1) a fiber optic member including a plurality of optical fibers arrayed two-dimensionally, and transmitting an optical image, being input from an input end face configured by one end faces of the plurality of optical fibers, to an output end face configured by the other end faces of the plurality of optical fibers; (2) an imaging device including a plurality of pixels arrayed two-dimensionally, being optically coupled to the output end face of the fiber optic member, imaging the optical image output from the output end face, and outputting an acquired image; and (3) an image processing device performing flat field correction, for correcting a fixed pattern noise due to the fiber optic member and the imaging device, for the image output from the imaging device, and (4) the image processing device sets a first switching point of the flat field correction on the basis of a noise peak point in a variation in fixed pattern noise intensity with respect to a variation in output intensity in the pixel included in the image to be corrected, and (5) with respect to the flat field correction on each of the plurality of pixels in the image, performs the flat field correction by a predetermined correction pattern in a case where output intensity from an object pixel is lower than first switching intensity at the first switching point, and does not perform the flat field correction in a case where the output intensity from the object pixel is higher than the first switching intensity.

An image acquisition method of the above embodiment uses an image acquisition apparatus including (a) a fiber optic member including a plurality of optical fibers arrayed two-dimensionally, and transmitting an optical image, being input from an input end face configured by one end faces of the plurality of optical fibers, to an output end face configured by the other end faces of the plurality of optical fibers, and (b) an imaging device including a plurality of pixels arrayed two-dimensionally, and being optically coupled to the output end face of the fiber optic member, and the method includes (c) an imaging step of imaging the optical image output from the output end face of the fiber optic member by the imaging device, and outputting an acquired image; and (d) an image processing step of performing flat field correction, for correcting a fixed pattern noise due to the fiber optic member and the imaging device, for the image output from the imaging device, and (e) in the image processing step, a first switching point of the flat field correction is set on the basis of a noise peak point in a variation in fixed pattern noise intensity with respect to a variation in output intensity in the pixel included in the image to be corrected, and (f) with respect to the flat field correction on each of the plurality of pixels in the image, the flat field correction is performed by a predetermined correction pattern in a case where output intensity from an object pixel is lower than first switching intensity at the first switching point, and the flat field correction is not performed in a case where the output intensity from the object pixel is higher than the first switching intensity.

Here, as to the first switching point of flat field correction set in the image processing device, specifically for example, a configuration of setting, as the first switching point, a point which has output intensity higher by 5% than peak output intensity at the noise peak point can be used. Further, a configuration of setting, as the first switching point, a point which has output intensity higher than peak output intensity at the noise peak point and at which fixed pattern noise intensity expressed by a ratio to the output intensity is decreased to 2% can be used.

Further, the image acquisition apparatus may have a configuration in which the image processing device sets a second switching point having second switching intensity lower than the first switching intensity at the first switching point on the basis of the noise peak point, and performs the flat field correction by a first correction pattern in a case where the output intensity from the object pixel is lower than the second switching intensity, performs the flat field correction by a second correction pattern different from the first correction pattern in a case where the output intensity from the object pixel is higher than the second switching intensity and is lower than the first switching intensity, and does not perform the flat field correction in a case where the output intensity from the object pixel is higher than the first switching intensity.

Similarly, the image acquisition method may have a configuration in which in the image processing step, a second switching point having second switching intensity lower than the first switching intensity at the first switching point is set on the basis of the noise peak point, and the flat field correction is performed by a first correction pattern in a case where the output intensity from the object pixel is lower than the second switching intensity, the flat field correction is performed by a second correction pattern different from the first correction pattern in a case where the output intensity from the object pixel is higher than the second switching intensity and is lower than the first switching intensity, and the flat field correction is not performed in a case where the output intensity from the object pixel is higher than the first switching intensity.

In such a manner, it becomes possible to perform flat field correction on an image more suitably as a whole, by setting two switching points of the second switching point and the first switching point for the flat field correction, with reference to the noise peak point in a variation in fixed pattern noise intensity, by using the first correction pattern in a region in which output intensity is lower than that at the second switching point, by using the second correction pattern in a region between the second switching point and the first switching point, and by not performing the correction in a region in which output intensity is higher than that at the first switching point.

Further, in the above configuration, as to the second switching point of flat field correction set in the image processing device, specifically for example, a configuration of setting the noise peak point as the second switching point can be used. Further, as to the switching point of flat field correction, a configuration of further setting one or a plurality of switching points of the flat field correction between the second switching point and the first switching point, in addition to the above first and second switching points, and of using three or more types of correction patterns may be employed.

Further, in the configuration of the image acquisition apparatus, a scintillator being optically coupled to the input end face of the fiber optic member, and converting an incident radiation image into the optical image input into the fiber optic member may be further included in addition to the fiber optic member and the imaging device. In such a manner, according to the image acquisition apparatus with the configuration including the scintillator, for example, it is possible to suitably acquire an image by a radiation image such as an X-ray image.

The present invention can be used as an image acquisition apparatus and an image acquisition method that can suitably perform flat field correction for image acquisition in a configuration in which an imaging device and a fiber optic member are combined.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image acquisition apparatus comprising:
    a fiber optic member including a plurality of optical fibers arrayed two-dimensionally, and transmitting an optical image, being input from an input end face constituted by one end faces of the plurality of optical fibers, to an output end face constituted by the other end faces of the plurality of optical fibers;
    an imaging device including a plurality of pixels arrayed two-dimensionally, being optically coupled to the output end face of the fiber optic member, imaging the optical image output from the output end face, and outputting an acquired image; and
    an image processing device performing flat field correction, for correcting a fixed pattern noise due to the fiber optic member and the imaging device, for the image output from the imaging device, wherein
    the image processing device sets a first switching point of the flat field correction on the basis of a noise peak point in a variation in a fixed pattern noise intensity with respect to a variation in an output intensity in the pixel included in the image to be corrected, and
    with respect to the flat field correction on each of the plurality of pixels in the image, performs the flat field correction by a predetermined correction pattern in a case where the output intensity from an object pixel is lower than a first switching intensity at the first switching point, and does not perform the flat field correction in a case where the output intensity from the object pixel is higher than the first switching intensity.

2. The image acquisition apparatus according to claim 1, wherein the image processing device sets a point which has the output intensity higher by 5% than a peak output intensity at the noise peak point as the first switching point.

3. The image acquisition apparatus according to claim 1, wherein the image processing device sets a point which has the output intensity higher than a peak output intensity at the noise peak point and at which the fixed pattern noise intensity expressed by a ratio to the output intensity is decreased to 2% as the first switching point.

4. The image acquisition apparatus according to claim 1,
    wherein the image processing device sets a second switching point having a second switching intensity lower than the fast switching intensity at the first switching point on the basis of the noise peak point, and
    performs the flat field correction by a first correction pattern in a case where the output intensity from the object pixel is lower than the second switching intensity, performs the flat field correction by a second correction pattern different from the first correction pattern in a case where the output intensity from the object pixel is higher than the second switching intensity and is lower than the first switching intensity, and does not perform the flat field correction in a case where the output intensity from the object pixel is higher than the first switching intensity.

5. The image acquisition apparatus according to claim 4, wherein the image processing device sets the noise peak point as the second switching point.

6. The image acquisition apparatus according to claim 4, wherein the image processing device further sets one or a plurality of switching points of the flat field correction between the second switching point and the first switching point.

7. The image acquisition apparatus according to claim 1, comprising a scintillator being optically coupled to the input end face of the fiber optic member, and converting an incident radiation image into the optical image input into the fiber optic member.

8. An image acquisition method, comprising:
   imaging an optical image output from an output end face of a fiber optic member by an imaging device, and outputting an acquired image, wherein the fiber optic member includes a plurality of optical fibers arrayed two-dimensionally, and transmits an optical image, being input from the input end face constituted by one end faces of the plurality of optical fibers, to the output end face constituted by the other end faces of the plurality of optical fibers, and wherein the imaging device includes a plurality of pixels arrayed two-dimensionally, and being optically coupled to the output end face of the fiber optic member; and
   performing flat field correction, for correcting a fixed pattern noise due to the fiber optic member and the imaging device, for the image output from the imaging device, wherein
   during the imaging, setting a first switching point of the flat field correction on the basis of a noise peak point in a variation in a fixed pattern noise intensity with respect to a variation in an output intensity in the pixel included in the image to be corrected, and
   with respect to the flat field correction on each of the plurality of pixels in the image, the flat field correction is performed by a predetermined correction pattern in a case where the output intensity from an object pixel is lower than a first switching intensity at the first switching point, and the flat field correction is not performed in a case where the output intensity from the object pixel is higher than the first switching intensity.

9. The image acquisition method according to claim 8, wherein in the image processing step further comprising:
   during the imaging, setting a point which has the output intensity higher by 5% than a peak output intensity at the noise peak point as the first switching point.

10. The image acquisition method according to claim 8, further comprising:
    during the imaging, setting a point which has the output intensity higher than a peak output intensity at the noise peak point and at which the fixed pattern noise intensity expressed by a ratio to the output intensity is decreased to 2% as the first switching point.

11. The image acquisition method according to claim 8, further comprising:
    during the imaging, setting a second switching point having a second switching intensity lower than the first switching intensity at the first switching point is set on the basis of the noise peak point, and
    the flat field correction is performed by a first correction pattern in a case where the output intensity from the object pixel is lower than the second switching intensity, the flat field correction is performed by a second correction pattern different from the first correction pattern in a case where the output intensity from the object pixel is higher than the second switching intensity and is lower than the first switching intensity, and the flat field correction is not performed in a case where the output intensity from the object pixel is higher than the first switching intensity.

12. The image acquisition method according to claim 11, further comprising:
    during the imaging, setting the noise peak point as the second switching point.

13. The image acquisition method according to claim 11, further comprising:
    during the imaging, setting one or a plurality of switching points of the flat field correction between the second switching point and the first switching point.

14. The image acquisition method according to claim 8, further comprising:
    converting an incident radiation image into the optical image input into the fiber optic member, wherein a scintillator is optically coupled to the input end face of the fiber optic member.

* * * * *